No. 636,955. Patented Nov. 14, 1899.
R. R. CROSS.
AXLE BOX.
(Application filed Nov. 10, 1898.)
(No Model.)

Witnesses
F. H. Schitt
M. H. Chandler

Inventor
Ramdan R. Cross
by Grant Burroughs
Attorney

THE NORRIS PETERS CO., PHOTO-LITHO., WASHINGTON, D. C.

UNITED STATES PATENT OFFICE.

RANSLAR R. CROSS, OF ONEONTA, NEW YORK.

AXLE-BOX.

SPECIFICATION forming part of Letters Patent No. 636,955, dated November 14, 1899.

Application filed November 10, 1898. Serial No. 696,105. (No model.)

*To all whom it may concern:*

Be it known that I, RANSLAR R. CROSS, a citizen of the United States, residing at Oneonta, in the county of Otsego and State of New York, have invented certain new and useful Improvements in Axle-Boxes for Vehicles, of which the following is a full, clear, and exact description, such as will enable those skilled in the art to which it appertains to make and use the same, reference being had to the accompanying drawings, forming a part of this specification.

The invention relates to improvements in axle-boxes for vehicles of that class ordinarily termed "carriages" and "wagons."

It has for its object the provision of such a device whereby a reduction of the wear between the bearing-surfaces is secured and in which the bearing parts can be readily replaced by new ones when they become worn.

It also has for its object the provision of means whereby the axle-box can be secured on its spindle; and, further, it has for its object the provision of means whereby a proper lubrication of the bearing parts can be secured.

The invention consists in the novel construction, combination, and arrangement of parts, such as will be hereinafter fully described, pointed out in the appended claim, and illustrated in the accompanying drawings.

Figure 1:
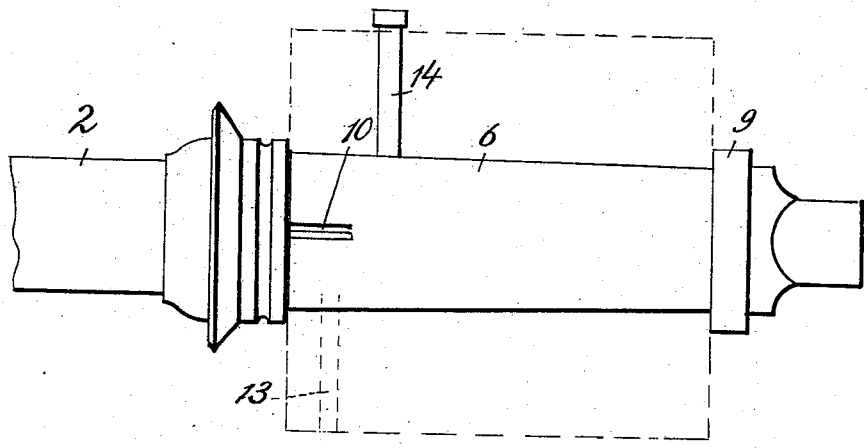
Figure 2:
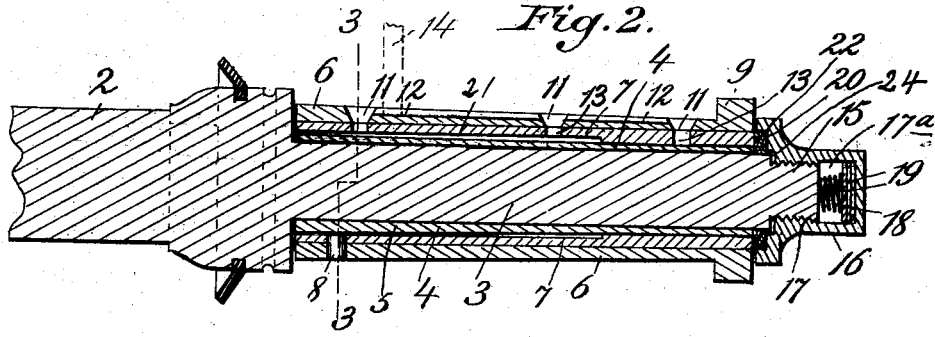
Figure 3:
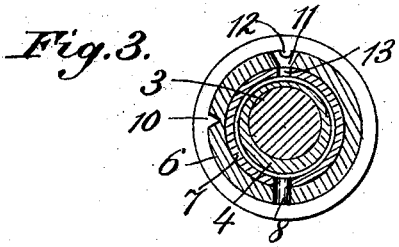
Figure 4:
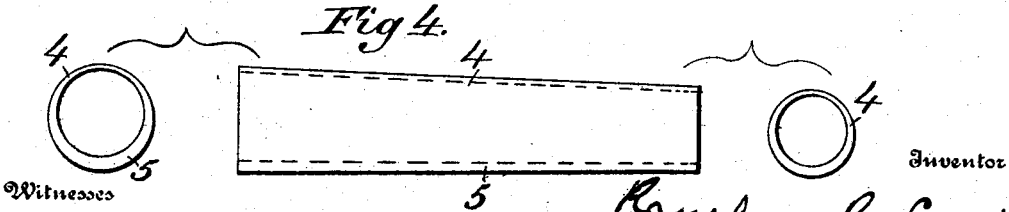

In the accompanying drawings, Figure 1 is a side elevation of an axle-box embodying the invention. In this view the hub of a wheel is shown in dotted lines. Fig. 2 is a longitudinal vertical sectional view of the same. Fig. 3 is a transverse sectional view on the line 3 3 of Fig. 2. Fig. 4 is a detail view showing the eccentric sleeve that is mounted on the spindle of the axle.

In the several views like reference characters designate corresponding parts.

The axle 2 may be of any construction suitable in the premises. Projecting from its end is a spindle 3, tapering slightly toward its outer end. On the spindle is mounted a sleeve 4, that forms the bearing on which the axle-box is journaled. The sleeve tapers slightly toward its outer end, and its inner and outer peripheries are eccentric. It is made fast on the spindle by being shrunk thereon, and its position is such that the thickest part 5 of the wall is on the lower side, where the sleeve receives the most wear from the axle-box. When the sleeve becomes too much worn, it can be readily replaced by a new one.

The axle-box, which may be mounted in a hub of any suitable construction, consists of the shell 6 and the bearing-tube 7. The bearing-tube is mounted within the shell, and the two are secured in their proper relative positions by the pin 8. The latter also serves to secure the axle-box within the hub. The shell 6 is provided with a flange 9, that serves as an additional securing device for holding the axle-box in place. In addition to the pin 8 a key 10 is provided for preventing the axle-box from turning in the hub. The inner periphery of the bearing-tube 7 has such dimensions as to allow it to register with the journal formed by the sleeve 4, mounted on the spindle 3. The bearing-tube is removably mounted in the shell, so that it can be replaced by a new one when it becomes worn. In the inner periphery of the bearing-tube an annular recess 21 is formed.

In the wall of the shell 6 are formed holes 11, connected by the groove 12, formed in the outer periphery of the said shell. In the bearing-tube 7 holes 13 are formed coincident with the holes 11. A tube 14, provided with a screw-cap, leads from the exterior of the hub to the groove 12. A lubricant can be introduced through the tube 14 into the groove 12, from which it passes through the holes 11 and 13 to the recess 21. The latter serves as a reservoir, and from it the lubricant passes to the bearing-surfaces of the sleeve 4 and the bearing-tube 7.

Means for securing the axle-box on the journal are provided. The outer end of the spindle 3 has a reduced screw-threaded extension 15. A nut 16 is provided with a screw-threaded opening 17, adapted to engage with the extension 15. In the head of the nut is a chamber 17ª, forming a continuation of the opening 17. In this chamber is a spring 18, bearing on the end of the extension 15, and interposed between the spring and the rear wall of the chamber are the disks 19. The spring by being compressed between the end of the extension and the nut holds the latter in place against accidental displacement. As the nut becomes worn and the extension projects farther into the chamber room for the spring can be secured by removing one or more of the disks. Then, again, if the spring should become weakened, to secure a greater tension of the same disks can be added. In the inner face of the nut are the concentric annular recesses 20 and 24, respectively. In the outer recess 20 is seated the washer 22, bearing on the outer ends of the sleeve 4 and the bearing-tube 7 and serving to hold the latter in place when the nut is in place on the spindle. The washer also prevents the lubricant from escaping from between the bearing-surfaces of the sleeve mounted on the spindle and the bearing-tube carried in the shell. The inner recess 24 receives the shoulder of the spindle and permits the adjustment of the nut on the screw-threaded extension. When the nut is turned onto the screw-threaded extension and properly adjusted, the axle-box is held on the journal against accidental displacement.

While the hereinbefore-described device is the preferred embodiment of the invention, yet it can be departed from to a considerable extent without departing from the spirit of the invention.

Having thus described the invention, what I claim, and desire to secure by Letters Patent, is—

In an axle-box, the combination of a spindle having a reduced screw-threaded extension, a sleeve having eccentric inner and outer peripheries secured on said spindle with the thickest part of its wall on the under side, a shell adapted to be mounted in a hub, a bearing-tube placed in said shell and journaled on said sleeve, a nut having a chamber in its head turned on the screw-threaded extension of the spindle and having an inner annular recess in its face to receive the shoulder of the spindle and provided with an annular recess outside of the shoulder-receiving recess, a washer carried in said outer recess and bearing on the ends of said sleeve and said tube, a locking-spring in said chamber in the head of the nut and bearing on the end of said spindle, and a series of removable disks interposed between said spring and said nut.

In testimony whereof I hereunto affix my signature in the presence of two witnesses.

RANSLAR R. CROSS.

Witnesses:
CHAS. D. TOWNSEND,
JESSAMYN DAVISON.